United States Patent [19]

Lin

[11] Patent Number: 5,740,723
[45] Date of Patent: Apr. 21, 1998

[54] PORTABLE OUTDOOR HIGH TEMPERATURE GRIDDLE

[76] Inventor: Michael D. Lin, 540 Chestnut Ave., San Bruno, Calif. 94066

[21] Appl. No.: 820,532

[22] Filed: Mar. 19, 1997

Related U.S. Application Data

[63] Continuation-in-part of Ser. No. 673,331, Jun. 28, 1996, abandoned, which is a continuation-in-part of Ser. No. 559,741, Nov. 15, 1995, abandoned.

[51] Int. Cl.$^6$ .................... F24C 3/00; A47J 37/10
[52] U.S. Cl. .................... 99/422; 99/447; 99/337; 126/42; 126/39 K
[58] Field of Search .................... 99/337, 422, 425, 99/447, 645; 126/42, 39 K, 39 N

[56] References Cited

U.S. PATENT DOCUMENTS

| 4,342,359 | 8/1982 | Lee | 99/447 X |
| 4,715,356 | 12/1987 | Reynolds | 126/39 K X |
| 4,724,823 | 2/1988 | Simpson | 99/447 X |

Primary Examiner—Reginald L. Alexander
Attorney, Agent, or Firm—Bruce H. Johnsonbaugh

[57] ABSTRACT

A portable, outdoor, high temperature griddle is provided capable of cooking international foods in a cross-wind without adversely affecting the flame. A wind-deflector is provided which sits between the griddle and the burners and deflects the wind along a tortuous pathway to reach the burners.

7 Claims, 4 Drawing Sheets

PORTABLE OUTDOOR HIGH TEMPERATURE GRIDDLE

CROSS-REFERENCE TO RELATED APPLICATION

This application is a continuation-in-part of Ser. No. 08/673,331 filed Jun. 28, 1996 abandoned entitled PORTABLE HIGH TEMPERATURE GRIDDLE which was a continuation-in-part of Ser. No. 08/559,741 filed Nov. 15, 1995 and entitled PORTABLE TEPPANYAKI GRIDDLE now abandoned.

BACKGROUND AND BRIEF SUMMARY OF THE INVENTION

This invention relates generally to portable cooking devices. More particularly, the present invention pertains to a portable, outdoor, high temperature griddle which utilizes a wind deflector together with a very thick metallic cooking surface which allows rapid outdoor cooking of meats and poultry as well as vegetables and international dishes such as chow mein, chop suey, and spaghetti.

The prior art includes a variety of portable cooking appliances, including conventional outdoor barbecues and variations on those barbecues. For example, the Von Kohorn U.S. Pat. No. 4,788,905, dated Dec. 6, 1988, provides a combination barbecue grill and griddle wherein the heat source is positioned a considerable distance below the grill and griddle. Von Kohorn teaches a relatively low temperature, open fire grill cooking system with the inherent disadvantage of juices dropping down through the grill into the heat source and causing unwanted flare-ups and flames which tend to burn the meat and occasionally present safety hazards. The low temperature barbecues also take much longer to cook a meal than the present invention.

The prior art also includes very massive and permanently built-in high temperature non-perforated griddles such as used by the Benihana restaurant chain. The high temperature griddles used by the Benihana restaurant chain have a solid cooking surface which is relatively massive so that the cooking surface does not become deformed as a result of the continuous application of intense heat to its lower surface. These built-in and permanent high temperature griddles allow the cooking of meats as well as vegetables very quickly, typically in less than half the time of a conventional barbecue such as Von Kohorn. However, the massive high temperature griddles utilized by the Benihana restaurant chain do not lend themselves to a portable type of cooking system.

The prior art includes the Sullivan U.S. Pat. No. 4,369,763 dated Jan. 25, 1983 which teaches a cumbersome, mobile griddle but without a wind deflector, making it unacceptable for outdoor use. It is also known in the prior art to provide vertical wind deflectors that extend around three sides of the stove and above the burners.

According to the present invention, a wind-resistant, portable high temperature griddle for outdoor use is provided. A thick and solid metallic plate forms a cooking surface and a wind-deflecting support means are provided for carrying the massive cooking surface and to facilitate using the invention outdoors. In addition, a portable heating system is provided which delivers and regulates the intense flame which is applied directly to the lower surface of the massive metal plate.

A primary object of the invention is to provide a portable, outdoor, high temperature griddle which utilizes a massive and non-perforated metallic cooking surface capable of withstanding intense heat, capable of cooking meats and vegetables outdoors in the wind in less than half the time of conventional portable barbecues.

A further object of the invention is to provide a wind-resistant, high temperature griddle capable of cooking international cuisine without adverse effects caused by cross-wind blowing out the flame.

Another object of the invention is to provide a portable high temperature griddle which avoids flare-ups caused by conventional open fire barbecue grills when juices drip down onto the heat source.

A further object of the invention is to provide a high temperature outdoor griddle capable of being utilized with outdoor furniture.

Another object of the invention is to provide a solid, non-perforated griddle which can be used outdoors and withstands cutting and dicing of food on its cooking surface.

Other objects and advantages will become apparent from the following description and the drawings wherein:

BRIEF DESCRIPTIONS OF THE DRAWINGS

DETAILED DESCRIPTION OF THE DRAWINGS

Figure 1:
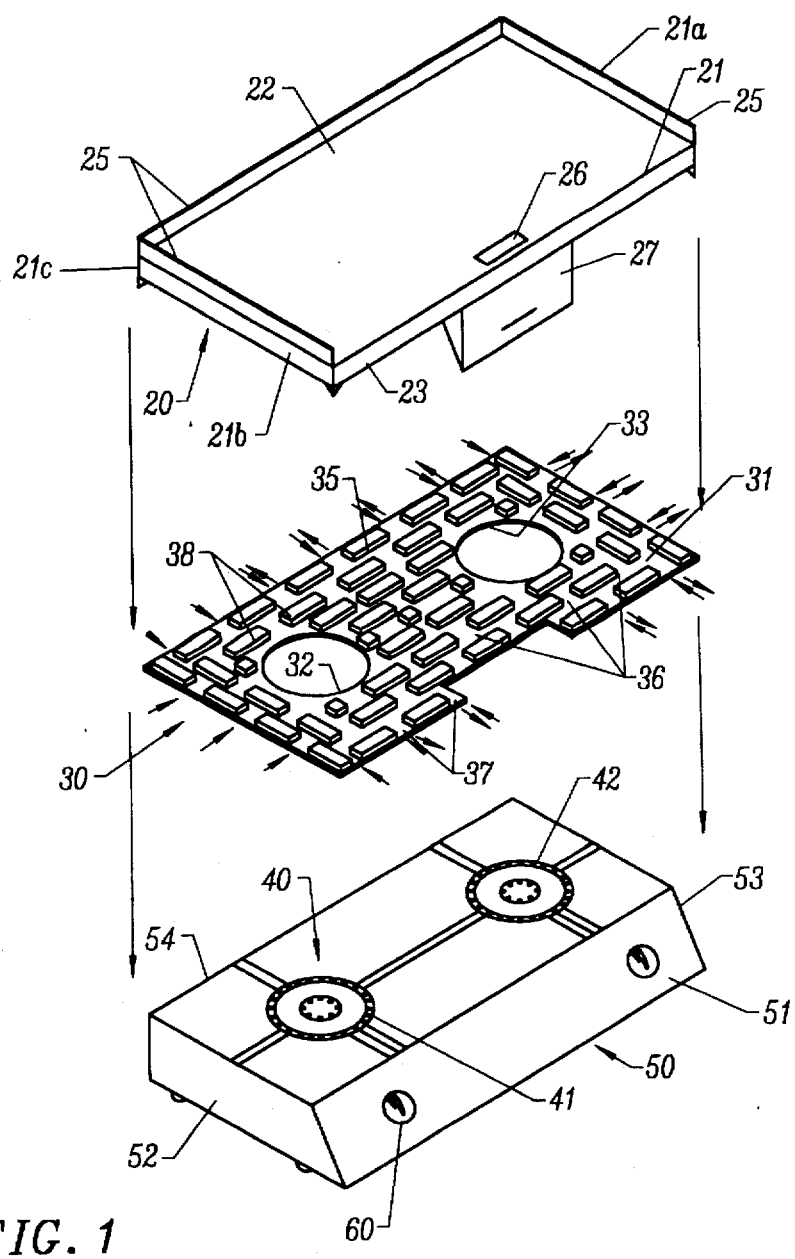
FIG. 1 is a schematic representation of the present invention shown in an exploded, perspective view.

FIG. 1 shows a perspective exploded view of a thick solid metallic plate means 20 according to the present invention. Plate means 20 is preferably stainless steel but alternatively may be constructed of mild steel or aluminum. However, aluminum does not withstand cutting and dicing of foods as well as steel. Plate means 20 includes a solid non-perforated flat slab 21 having an upper surface 22 which forms a cooking surface and a planar, lower surface 23 to which heat is applied. Plate means 20 should have a thickness of ½ inch or more to withstand the continuous intense heat applied to its lower surface 23 without deforming. A grease ridge 25 is carried along the side edges 21a, 21b and back edge 21c of the plate means 20. A grease slot 26 is formed in plate means 20 to allow grease to drain into grease catcher 27.

A portable, wind-deflecting support means 30 is provided. Wind-deflecting support means 30 is a generally planar member 31 having openings 32 and 33 formed therein, through which flames from burners 41 and 42 pass. The upper surface 35 of support means 30 has a pattern of wind-guiding passageways 36 formed therein to force cross-winds to travel a tortuous pathway to reach burners 41 and 42 to provide combustion air. A plurality of wind inlets 37 is provided around the periphery of support means 30. A plurality of transverse wind-blocking ridges 38 are formed adjacent the wind inlets 37 to force the entering cross-wind to move along a tortuous pathway to reach burners 41 and 42. Support means 30 sits on top of the burner casing 50.

Burner casing 50 has a front wall 51, side walls 52 and 53, and rear wall 54. Since walls 51–54 are non-perforated, cross-wind must flow through tortuous passageways 36 formed between ridges 38 to reach burners 41 and 42.

Heating means 40 is carried by casing 50 and in the preferred embodiment includes two gas burners 41 and 42. A conventional control valve 60 serves to regulate the application of heat to the lower surface 23 of plate means 20.

A conventional propane gas tank may be used to feed gas through a conventional fitting to a flexible gas supply line which connects to control valve 60.

The embodiment shown in FIG. 1 provides a non-perforated portable griddle capable of achieving very high temperatures on the cooking surface within a matter of seconds after heat is applied and is capable of cooking an entire meal, including meats and vegetables, outdoors in a cross-wind in less than half the time of a conventional open-fire barbecue.

Figure 2:
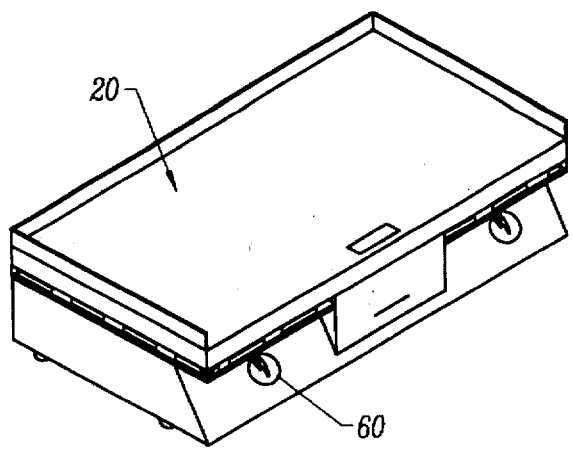
FIG. 2 is a schematic representation of the assembled components shown in FIG. 1.

FIG. 2 shows the assembled form of the components of FIG. 1.

Figure 3A:
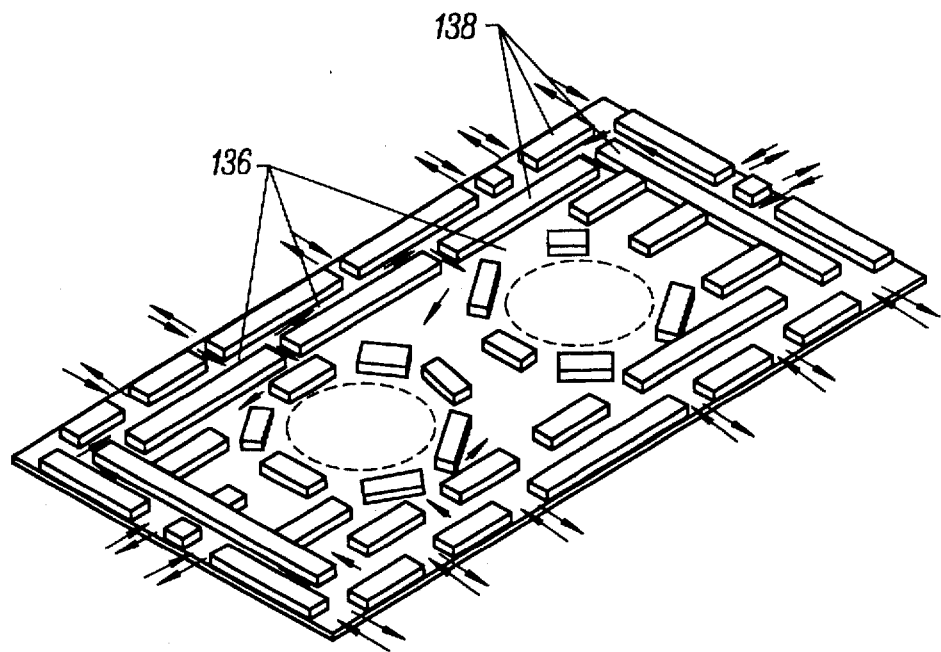
FIG. 3A is a perspective view of an alternative form of the invention.

FIG. 3A shows in perspective an alternate embodiment of the invention wherein a somewhat different pattern 136 is provided. The tortuous passageways 136 shown in FIG. 3A may be achieved in several ways. First, the pattern of ridges 138 may either be stamped or cast into sheet metal or cast iron, for example. Alternatively, the ridges 138 may be formed by attaching spacers to a flat metallic plate. The cross-sectional shape of the spacers 138 is not critical, and may include rectangular, triangular or other shapes. The significant part of the ridges or spacers 138 is that they form tortuous pathways 136 which effectively slows down the cross-winds and prevents the cross-winds from blowing out the flames from burners 41 and 42 or by otherwise adversely affecting the flames created by burners 41 and 42. The effect of the cross-winds can be quite serious on a high temperature griddle which cooks food very quickly. By eliminating adverse effects of cross-wind, I have achieved an outdoor griddle capable of preparing international cuisine in outdoor breezy conditions.

Figure 3B:
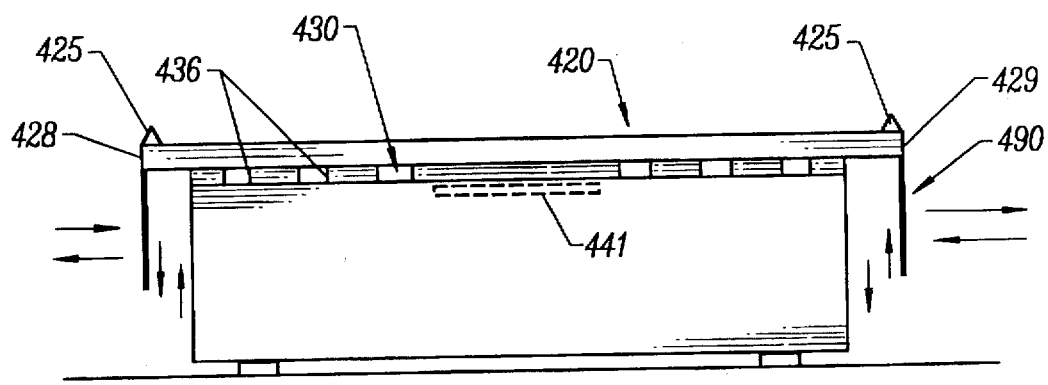
FIG. 3B is a sectional view showing another embodiment of the invention.

FIG. 3B shows another feature of the invention. Plate means 420 is identical to plate means 20 of FIG. 1, except that plate means 420 has a wind shield 490 that extends downwardly from the side edges 428 and 429 and the back edge (not shown) of plate means 420. The shield 490 is a non-perforated, metallic member and extends downwardly below the level of burner 441. Wind-deflecting support means 430 has tortuous pathways 436 formed therein. Wind shield 490 may be used either together with wind-resistant support means 430 or may be used without wind-resistant support means 430.

Figure 4:
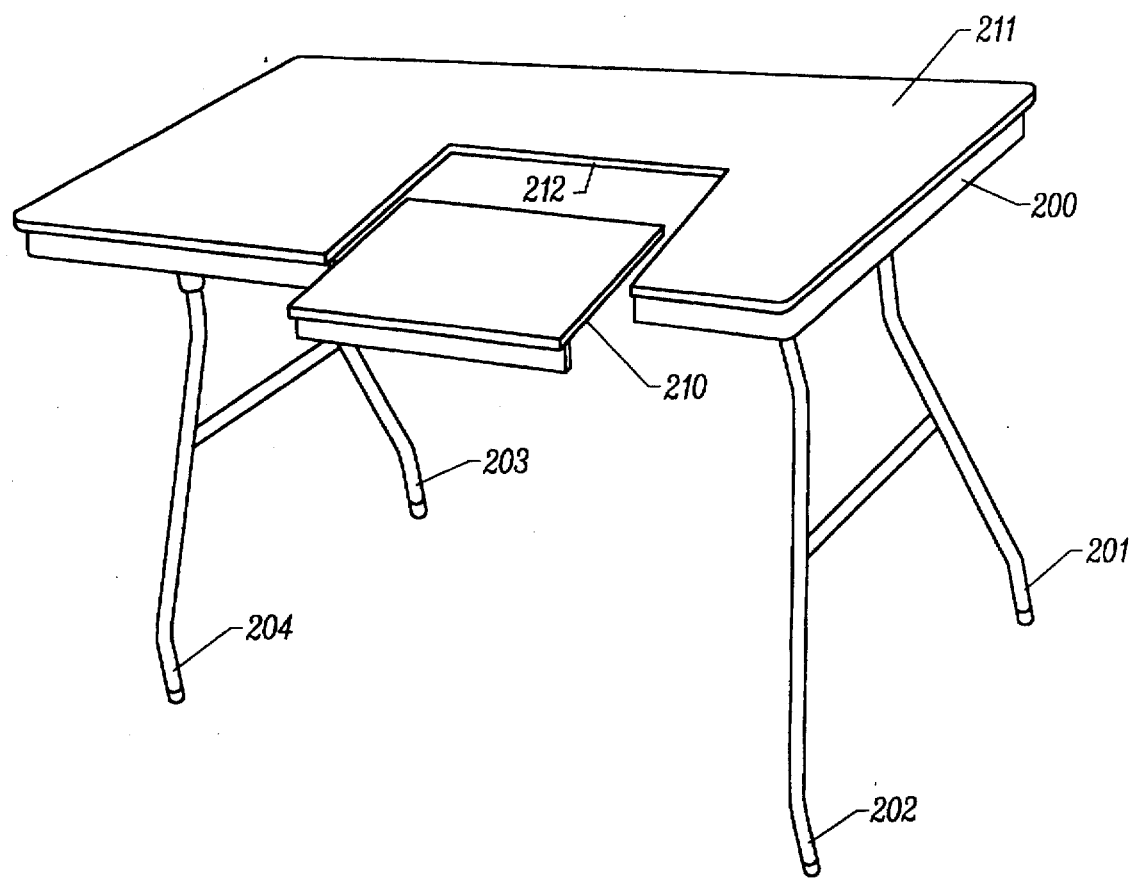
FIG. 4 is a perspective view of an outdoor table used with the invention.

FIG. 4 is a perspective view of an outdoor table 200 with folding legs 201 and 202 which fold upwardly together. Legs 203 and 204 also fold upwardly together. A removable section 210 of the top 211 is taken out of the table and the outdoor griddle of the present invention is simply placed into the opening 212 on a cart.

Figure 5A:
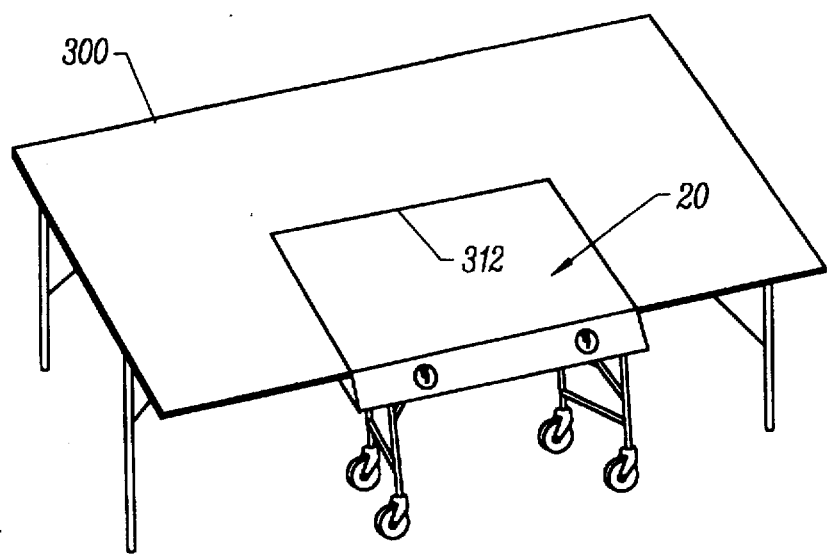
FIGS. 5A, 5B and 5C are perspective views of the components of other outdoor furniture for use with the invention.
Figure 5B:
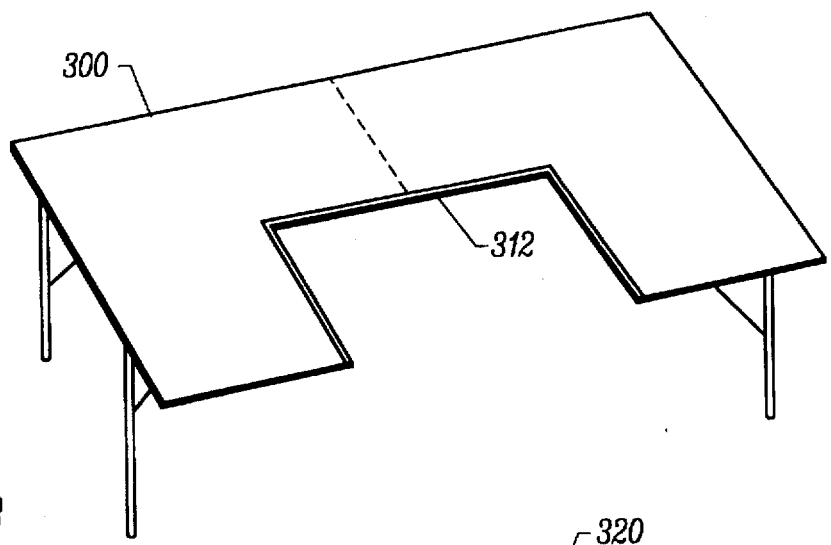
Figure 5C:
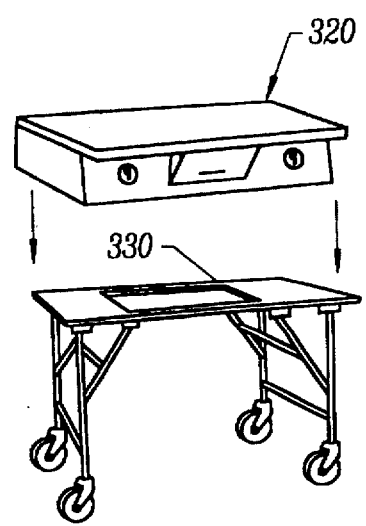

FIGS. 5A, 5B and 5C show another type of outdoor table 300 having a removable section (not shown) which, when removed, allows the griddle 20 of the present invention to be placed in the opening 312 on a conventional wheeled cart 330 and it is ready for use.

I claim:

1. A portable, outdoor, high temperature griddle, comprising:

a thick, solid metallic plate means having upper and lower surfaces, said upper surface forming a cooking surface, said plate means having sufficient thickness to withstand continuous, direct and intense heat applied to its lower surface without deforming, heating means for applying a direct, intense flame to said lower surface of said solid metallic plate means, portable, wind-deflecting support means for carrying said solid metallic plate means, said portable, wind-deflecting support means having an upper surface formed with an array of wind-guiding passageways which channel any cross-wind along a tortuous pathway to prevent said cross-wind from blowing out or adversely affecting the flame under said metallic plate means, and, heating control means for regulating the application of heat to said lower surface of said solid metallic plate means.

2. The apparatus of claim 1 wherein said wind-deflecting support means has a pattern of passageways formed in its upper surface wherein a plurality of wind inlets is provided around the periphery of said support means and a plurality of wind-blocking ridges are formed transversely to said inlets to force cross-wind to follow a tortuous pathway to provide combustion air for said heating means.

3. The apparatus of claim 1 further comprising a wind shield means which is carried by said metallic plate means, said wind shield means extending downwardly from the side edges and back edge of said plate means to a point below said heating means.

4. The apparatus of claim 1 further comprising an outdoor table having a top with an opening formed therein adapted to receive said griddle.

5. A portable, outdoor, high temperature griddle, comprising:

a thick, solid metallic plate means having upper and lower surfaces, said upper surface forming a cooking surface, said plate means having sufficient thickness to withstand continuous, direct and intense heat applied to its lower surface without deforming, heating means for applying a direct, intense flame to said lower surface of said solid metallic plate means, wind shield means carried by said metallic plate means, said wind shield means extending downwardly from the side edges and back edge of said plate means to a position below said heating means, and heating control means for regulating the application of heat to said lower surface of said solid metallic plate means.

6. The apparatus of claim 5 further comprising portable, wind-deflecting support means for carrying said solid metallic plate means, said portable, wind-deflecting support means having an upper surface formed with an array of wind-guiding passageways which channel any cross-wind along a tortuous pathway to prevent said cross-wind from blowing out or adversely affecting the flame under said metallic plate means.

7. The apparatus of claim 6 wherein said wind-deflecting support means has a pattern of passageways formed in its upper surface wherein a plurality of wind inlets is provided around the periphery of said support means and a plurality of wind-blocking ridges are formed transversely to said inlets to force cross-wind to follow a tortuous pathway to provide combustion air for said heating means.

* * * * *